US012266925B2

(12) United States Patent
Meisinger, Sr. et al.

(10) Patent No.: US 12,266,925 B2
(45) Date of Patent: Apr. 1, 2025

(54) TRANSMISSION LINE FAULT LOCATION, ISOLATION AND SYSTEM RESTORATION (FLISR) SYSTEM

(71) Applicant: S&C Electric Company, Chicago, IL (US)

(72) Inventors: Michael John Meisinger, Sr., Chicago, IL (US); Martin T. Bishop, Oak Creek, WI (US); Stephen E. Williams, Caledonea, WI (US)

(73) Assignee: S&C Electric Company, Chicago, IL (US)

( * ) Notice: Subject to any disclaimer, the term of this patent is extended or adjusted under 35 U.S.C. 154(b) by 310 days.

(21) Appl. No.: 17/853,977

(22) Filed: Jun. 30, 2022

(65) Prior Publication Data

US 2023/0052174 A1  Feb. 16, 2023

Related U.S. Application Data

(60) Provisional application No. 63/232,318, filed on Aug. 12, 2021.

(51) Int. Cl.
*H02H 7/22* (2006.01)
*H02H 1/00* (2006.01)

(52) U.S. Cl.
CPC ............ *H02H 7/22* (2013.01); *H02H 1/0007* (2013.01)

(58) Field of Classification Search
CPC .......... H02H 7/22; H02H 1/0007; H02H 7/30; H02H 3/06
See application file for complete search history.

(56) References Cited

U.S. PATENT DOCUMENTS

| 2008/0024142 A1* | 1/2008 | Opfer | H01H 75/04 324/555 |
| 2018/0358805 A1 | 12/2018 | Staszesky et al. | |

(Continued)

FOREIGN PATENT DOCUMENTS

| CN | 108362977 B | 7/2021 |
| WO | 2021055227 A1 | 3/2021 |

OTHER PUBLICATIONS

S&C "IntelliRupter® PulseCloser® Fault Interrupter". Jan. 2022. Retrieved from the Internet: <URL: https://www.sandc.com/globalassets/sac-electric/documents/public---documents/sales-manual-library---external-view/descriptive-bulletin-766-30.pdf?dt=638602811756778168> (Year: 2022).*

(Continued)

*Primary Examiner* — Jared Fureman
*Assistant Examiner* — Nicolas Bellido

(57) ABSTRACT

An electrical power network employing fault location, isolation and system restoration. The system includes a plurality of switching devices electrically coupled along a power line downstream of a fault interrupting device. The switching devices each have current and voltage sensing capability and the capability to provide pulse tests for detecting fault presence. The fault interrupting device performs reclosing operations, and when the plurality of switching devices detect fault presence a predetermined number of times in coordination with reclosing operations performed by the fault interrupting device and detect loss of voltage, each switching device opens. The fault interrupting device closes when the switching devices open, and the switching devices sequentially pulse test and close from a furthest upstream switching device when detecting return of voltage and no fault presence until a switching device closest to the fault pulse tests and detects fault presence and locks open.

17 Claims, 3 Drawing Sheets

(56) References Cited

U.S. PATENT DOCUMENTS

| | | | |
|---|---|---|---|
| 2019/0245342 A1* | 8/2019 | Sharon | H02H 7/26 |
| 2019/0280476 A1* | 9/2019 | Fan | G01R 31/08 |
| 2020/0076183 A1* | 3/2020 | Montenegro | H02H 7/30 |
| 2020/0099217 A1* | 3/2020 | Meisinger | H02H 3/08 |
| 2021/0091558 A1* | 3/2021 | Meisinger | H02H 7/22 |
| 2021/0091566 A1* | 3/2021 | Porter | H02J 3/14 |
| 2021/0104888 A1 | 4/2021 | Keller et al. | |
| 2021/0273451 A1* | 9/2021 | Bishop | H02H 3/063 |
| 2021/0281062 A1* | 9/2021 | Keckalo | H02H 1/0007 |
| 2021/0382096 A1* | 12/2021 | Booth | G01R 21/133 |
| 2022/0109293 A1* | 4/2022 | Meisinger, Sr. | H02H 3/06 |

OTHER PUBLICATIONS

International Search Report and Written Opinion for International Application No. PCT/US2022/35864 dated Nov. 16, 2022. (14 pages).

\* cited by examiner

TRANSMISSION LINE FAULT LOCATION, ISOLATION AND SYSTEM RESTORATION (FLISR) SYSTEM

CROSS-REFERENCE TO RELATED APPLICATION

This application claims the benefit of priority from the U.S. Provisional Application No. 63/232,318, filed on Aug. 12, 2021, the disclosure of which is hereby expressly incorporated herein by reference for all purposes.

BACKGROUND

Field

This disclosure relates generally to an electrical power network employing fault location, isolation and system.

Discussion of the Related Art

An electrical power distribution network, often referred to as an electrical grid, typically includes power generation plants each having power generators, such as gas turbines, nuclear reactors, coal-fired generators, hydro-electric dams, etc. The power plants provide power at a variety of medium voltages that are then stepped up by transformers to a high voltage AC signal to be connected to high voltage transmission lines that deliver electrical power to substations typically located within a community, where the voltage is stepped down by transformers to a medium voltage for distribution. The substations provide the medium voltage power to three-phase feeders including three single-phase feeder lines that provide medium voltage to various distribution transformers and lateral line connections. three-phase and single-phase lateral lines are tapped off of the feeder that provides the medium voltage to various distribution transformers, where the voltage is stepped down to a low voltage and is provided to loads, such as homes, businesses, etc. Power distribution networks of the type referred to above typically include switching devices, circuit breakers, reclosers, interrupters, etc. that control the flow of power throughout the network.

Periodically, faults occur in the distribution network as a result of various things, such as animals touching the lines, lightning strikes, tree branches falling on the lines, vehicle collisions with utility poles, etc. Faults may create a short-circuit that increases the stress on the network, which may cause the current flow from the substation to significantly increase, for example, many times above the normal current, along the fault path. This amount of current causes the electrical lines to significantly heat up and possibly melt, and also could cause mechanical damage to various components in the substation and in the network. Many times the fault will be a transient or intermittent fault as opposed to a persistent or permanent fault, where the thing that caused the fault is removed a short time after the fault occurs, for example, a lightning strike, where the distribution network will almost immediately begin operating normally after a brief disconnection from the source of power.

Fault interrupters, such as reclosers that employ vacuum interrupters, are provided on utility poles and in underground circuits along a power line and have a switch to allow or prevent power flow downstream of the recloser. These reclosers detect the current and voltage on the feeder to monitor current flow and have controls that indicate problems with the network circuit, such as detecting a high current during a fault event. If such a high fault current is detected the recloser is opened in response thereto, and then after a short delay closed to determine whether the fault is still present on the circuit. If high fault current flows when the recloser is closed after opening, it is immediately re-opened according to the timing that is set in the recloser. If the fault current is detected a second time, or multiple times, during subsequent opening and closing operations indicating a persistent fault, then the recloser remains open, where the time between detection tests may increase after each test. For a typical reclosing operation for fault detection tests, about 3 to 6 cycles or 50 to 100 ms of fault current pass through the recloser before it is opened but testing on delayed curves can allow fault current to flow for much longer times, which could cause significant stress on various components in the network.

In order to overcome this problem, fault interrupters have been developed in the art that use pulse testing technologies where the closing and then opening of, for example, vacuum interrupter contacts is performed in a pulsed manner so that the full fundamental frequency multiple cycle fault current is not applied to the network while the recloser is testing to determine if the fault is still present. Typically these pulses are about one-half of a fundamental frequency current cycle. Additionally, these fault interrupters close at the appropriate point on the voltage waveform to eliminate the asymmetrical current, which reduces the stresses due to high current in the components.

When a fault is detected, it is desirable that the first fault interrupter upstream from the fault be opened as soon as possible so that the fault is quickly removed from the network to prevent damage to equipment, personal injury, fires, etc., and so that the loads upstream of that fault interrupter are not disconnected from the power source and service is not interrupted to them. It is further desirable that if the first fault interrupter upstream from the fault does not open for whatever reason, then a next fault interrupter upstream from the fault is opened, and so on. In order to accomplish this, it is necessary that some type of communications or coordination protection scheme be employed in the network so that the desired fault interrupter is opened in response to the fault.

A sectionalizer is a self-contained, circuit-opening device typically used in combination with source-side protective devices, such as reclosers or circuit breakers, to automatically isolate faulted sections of an electrical distribution network. Sectionalizers are typically distributed between and among the reclosers to provide a system for isolating smaller sections of the network in response to a fault. Sectionalizers typically rely on observing a sequence of fault currents and the presence and absence of voltage either to indicate the presence of a fault or count the number of reclosing attempts, and then perform circuit isolation by opening the current carrying contacts in the device when the predetermined number of reclosing attempts has been reached. Existing power distribution circuit sectionalizers detect the passage of fault currents, including both the initial fault event and subsequent recloser-initiated events, as part of more elaborate fault isolation and restoration processes. These processes may include counting discrete intervals of fault current passage, or counting discrete intervals of voltage presence and absence. Equipment and devices that recognize pulse testing operations measure current and/or voltage and require sensors and controls that can implement pulse recognition algorithms.

SUMMARY

The following discussion discloses and describes an electrical power network employing fault location, isolation and system restoration. The network includes a power line, a power source providing power to the power line, and a fault interrupting device electrically coupled to the power line, where the fault interrupting device is operable to detect fault current and perform reclosing operations to provide a test for the continued presence of a fault. The network also includes a plurality of switching devices electrically coupled along the power line downstream of the fault interrupting device. The switching devices each have current and voltage sensing capability, the ability to test for continued fault presence using a low energy pulse and have the same or similar opening response time subject to the influences of load. In response to a fault on the power line, the fault interrupting device performs the reclosing operations and the plurality of switching devices each accumulate the number of times that they detect fault current as a result of the reclosing operations. When the accumulated number of times reaches a predetermined number of times, such as two, and loss of voltage is detected as a result of the fault interrupting device opening, the plurality of switching devices open. When the plurality of switching devices open, the fault interrupting device does not detect the fault current and closes. The plurality of switching devices then sequentially pulse test and close from a farthest upstream switching device in response to detecting voltage on its upstream side and not detecting fault current on its downstream side until the switching device closest to the fault detects fault current when it pulse tests and locks open.

Additional features of the disclosure will become apparent from the following description and appended claims, taken in conjunction with the accompanying drawings.

DETAILED DESCRIPTION OF THE EMBODIMENTS

The following discussion of the embodiments of the disclosure directed to an electrical power network employing fault location, isolation and system restoration is merely exemplary in nature, and is in no way intended to limit the disclosure or its applications or uses.

Figure 1:
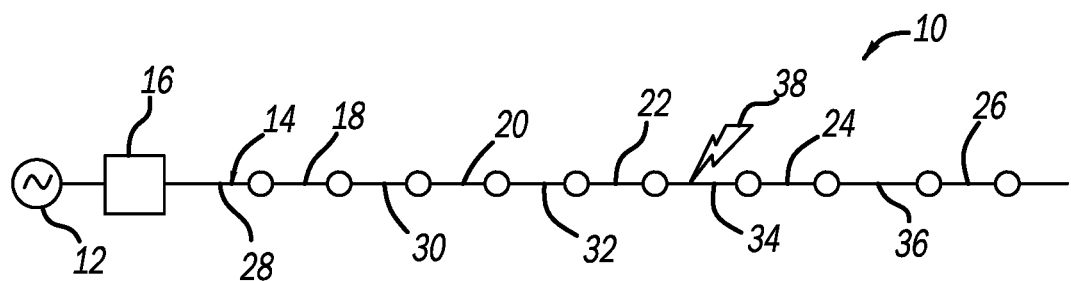
FIGS. 1 and 3-6 are simplified schematic type diagrams of an electrical power network that illustrates switch positions for a system and method for fault location, isolation and system restoration (FLISR)

FIG. 1 is a simplified schematic type diagram of an electrical power network 10, such as a radial medium voltage power distribution network operating between 12,000 and 38,000 volts, that illustrates a system and method for fault location, isolation and system restoration (FLISR). The network 10 includes an AC power source 12, such as an electrical substation that includes power transformers that step down high voltage power from a high voltage power line (not shown) to medium voltage, provided at one end of a feeder 14. A series of five switching devices 18, 20, 22, 24 and 26 are distributed along the feeder 14, where a fault interrupting device 16 is provided between the source 12 and the first switching device 18, and where the device 16 has reclosing capabilities. As used herein, the switching devices 18, 20, 22, 24 and 26 can be any suitable device, such as a pulse testing switching device, that are not in communication with each other, have current and voltage sensing capability and have the ability to test the circuit downline for fault presence using a pulse testing technique, but are not fault interrupting devices, where the switching devices 18, 20, 22, 24 and 26 have the same or similar opening response time subject to the influences of load. A feeder segment 28 is defined between the device 16 and the first switching device 18, a feeder segment 30 is defined between the switching devices 18 and 20, a feeder segment 32 is defined between the switching devices 20 and 22, a feeder segment 34 is defined between the switching devices 22 and 24, and a feeder segment 36 is defined between the switching devices 24 and 26.

Figure 2:
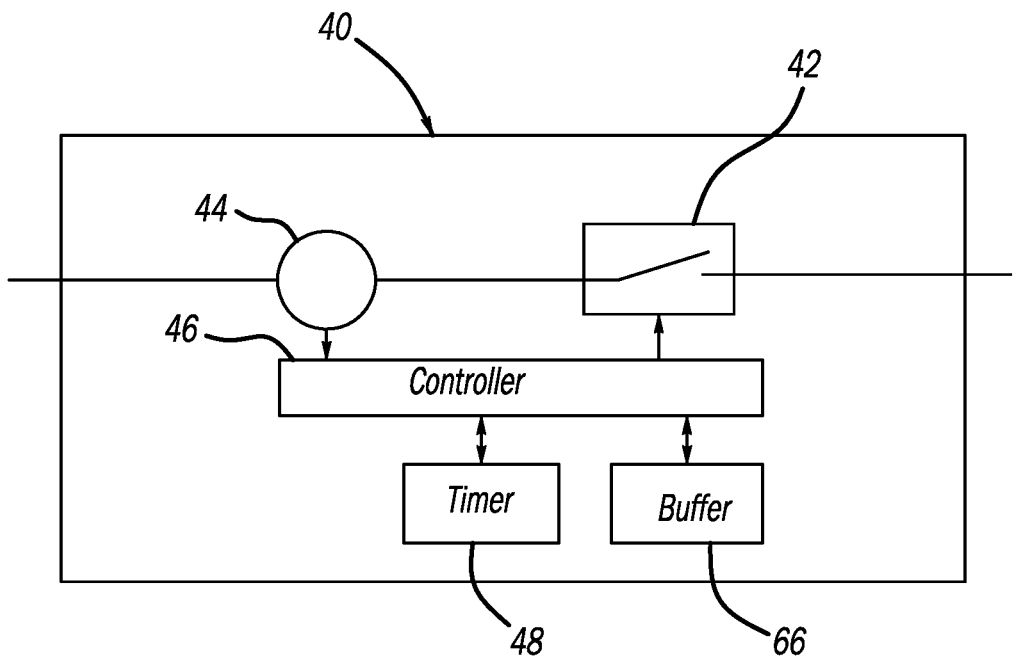
FIG. 2 is a simplified block diagram of a switching device.

FIG. 2 is a simplified block diagram of a switching device 40 intended to be a non-limiting representation of any one of the switching devices 18, 20, 22, 24 and 26, where the device 40 includes a switch 42, voltage/current sensors 44, a controller 46, a timer 48 and a buffer 66.

Figure 3:
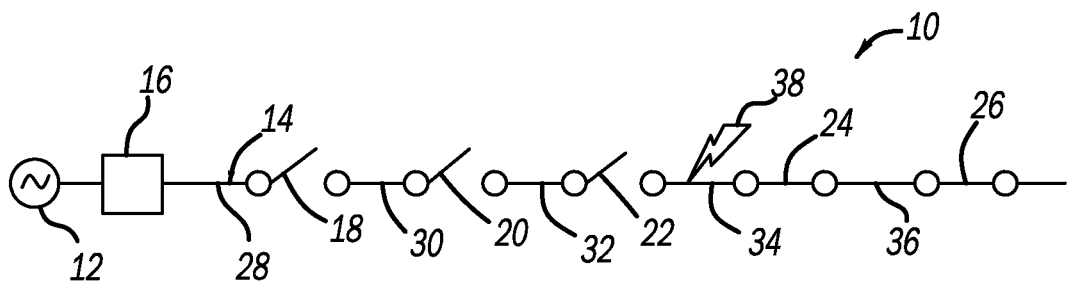

If a persistent fault 38 occurs in the line segment 34 it is desirable to open the switching devices 22 and 24 to isolate the fault 38 in the segment 34 so that power can be provided to the segments 28, 30 and 32 from the source 12 and possibly to the segment 36 from another source (not shown). When the fault 38 occurs, the device 16 and the switching devices 18, 20 and 22 detect the fault current flowing from the source 12 into the fault 38. When the device 16 detects the fault current it opens and then performs reclosing operations to determine if the fault 38 is still present. The switching devices 18, 20 and 22 are configured to accumulate in, for example, the buffer 66, the number of times that they detect the fault current in coordination with the number of times that the device 16 performs a reclosing operation, and will remain closed the first time that they detect fault current. When the accumulated number of times that the switching devices 18, 20 and 22 detect the fault current reaches a predetermined threshold, such as two, and then the switching devices 18, 20 and 22 detect loss of voltage when the device 16 opens the next time they will all open in unison, as shown in FIG. 3.

Figure 4:
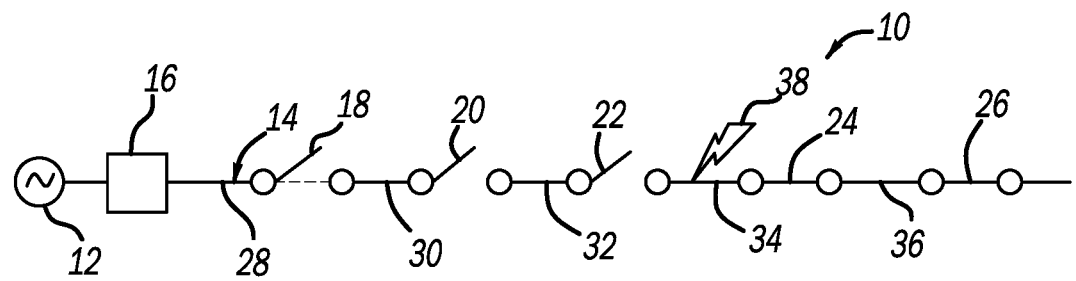
Figure 5:
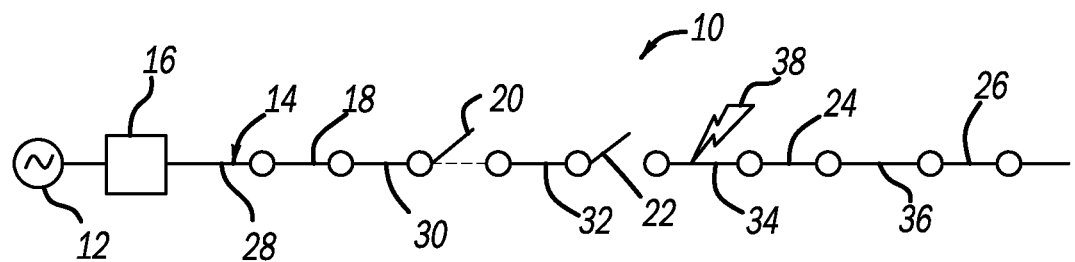
Figure 6:
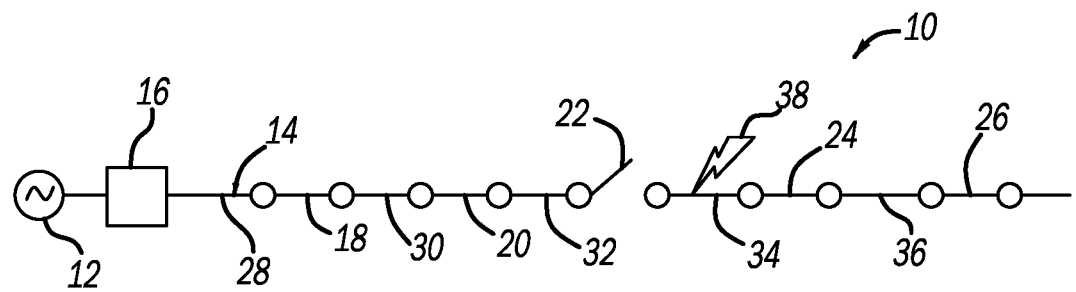

The device 16 then recloses again to test for the fault 38 and because the fault 38 is downstream of the switching device 18 and it is open, the device 16 does not detect fault current and remains closed. The switching device 18 then senses a return of voltage on its upstream side and pulse tests for the fault 38, as shown in FIG. 4. Because the fault 38 is downstream of the switching device 20 and it is open, the switching device 18 does not detect fault presence and closes. The switching device 20 then senses a return of voltage on its upstream side and pulse tests for the fault 38, as shown in FIG. 5. Because the fault 38 is downstream of the switching device 22 and it is open, the switching device 20 does not detect fault presence and closes. The switching device 22 then senses a return of voltage on its upstream side and pulse tests for the fault 38, as shown in FIG. 6. Because the fault 38 is in the segment 34, the switching device 22 detects the fault presence and locks open.

Figure 7:
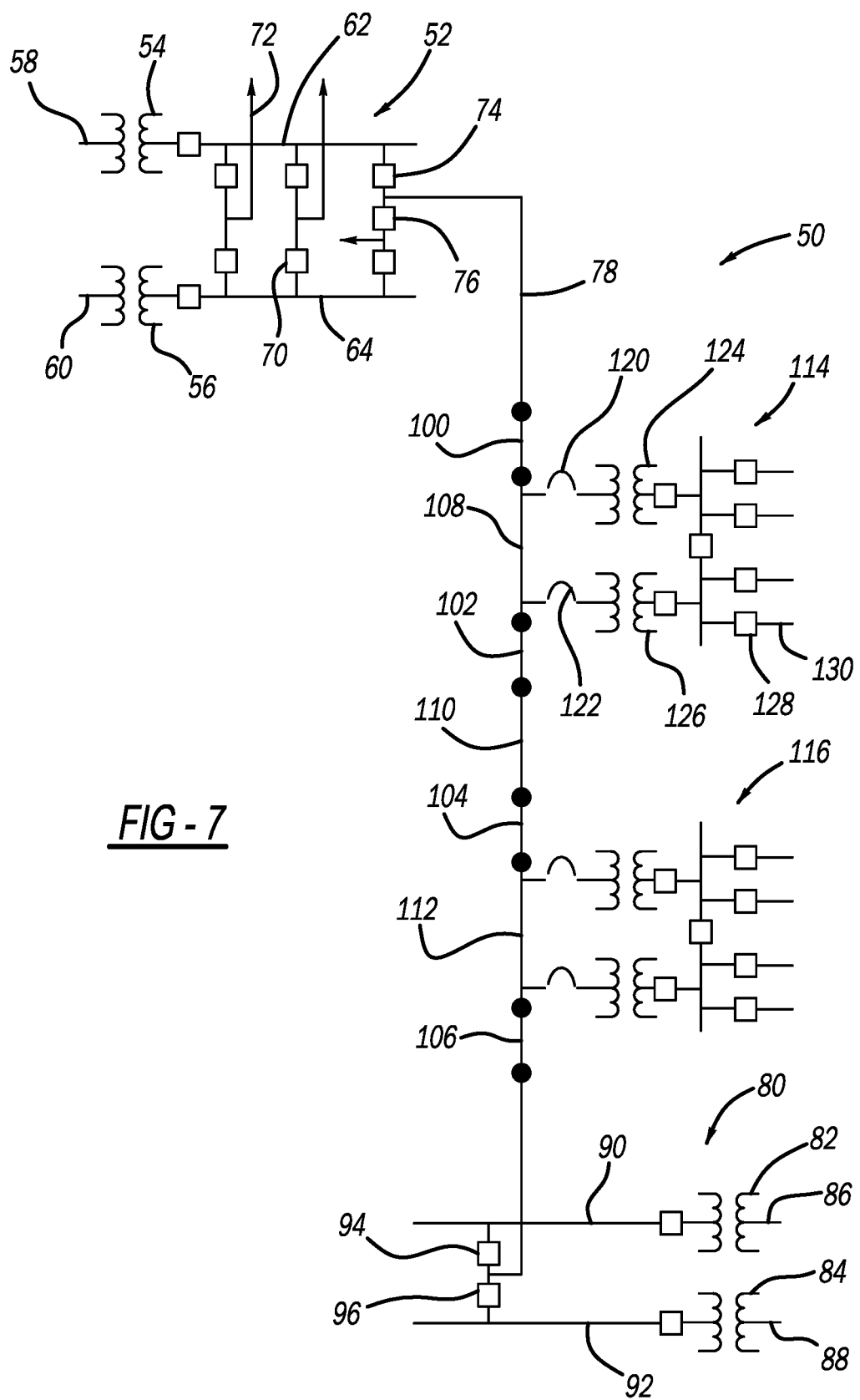
FIG. 7 is a schematic type diagram of a high voltage electrical power transmission network that illustrates a system and method for FLISR.

The system and method for FLISR as generally described above can be extended to high voltage transmission lines, such as 69,000 volts and higher. FIG. 7 is a schematic type diagram of an electrical power transmission network 50 that illustrates a system and method for FLISR showing this embodiment. The network 50 includes a large high voltage substation 52 having a pair of transformers 54 and 56 that down step extra high voltage, such as 345,000 volts, on lines 58 and 60, respectively, from a power plant (not shown) to high voltage provided on bus sections 62 and 64, respectively. Circuit breakers 70 are connected between the bus sections 62 and 64 and control whether power is placed on high voltage transmission lines 72. Two circuit breakers 74 and 76 having reclosing and fault interrupting capabilities are connected to the bus sections 62 and 64 control the power placed on one end of a high voltage transmission line 78. The network 50 also includes a small high voltage substation 80 having a pair of transformers 82 and 84 that step down extra high voltage on lines 86 and 88, respectively, from a power plant (not shown) to high voltage provided on bus sections 90 and 92. Two circuit breakers 94 and 96 having reclosing and fault interrupting capability are connected to the bus sections 90 and 92 and control the power placed on the opposite end of the high voltage transmission line 78.

A series of four switching devices 100, 102, 104 and 106 are distributed along the line 78. As above, the switching devices 100, 102, 104 and 106 can be any suitable device, such as a switching device that has pulse testing capability, that are not in communication with each other, have current and voltage sensing capability and are capable of testing for continued fault presence using a low energy pulse, but do not have fault interrupting ratings, where the switching devices 100, 102, 104 and 106 have the same or similar opening response time subject to the influences of load. A line segment 108 is defined between the switching devices 100 and 102, a line segment 110 is defined between the switching devices 102 and 104, and a line segment 112 is defined between the switching devices 104 and 106. A medium voltage substation 114 is tapped off of the segment 108 and a medium voltage substation 116 is tapped off of the segment 112. The substations 114 and 116 each include a pair of fuses 120 and 122, a pair of transformers 124 and 126 that step down the high voltage to a medium voltage, and circuit breakers 128 that control the medium voltage power placed on feeders 130.

The system and method for FLISR that operates in the network 50 is similar to the system and method for FLISR that operates in the network 10. If a persistent fault occurs in the segment 110, the circuit breakers 74 and 76 and the switching devices 100 and 102 detect fault current from the substation 52 into the fault and the circuit breakers 94 and 96 and the switching devices 104 and 106 detect fault current from the substation 80 into the fault. When the circuit breakers 74 and 94, for example, detect the fault current they initially open and then perform reclosing operations to determine if the fault is still present. The switching devices 100, 102, 104 and 106 accumulate the number of times that the switching devices 100, 102, 104 and 106 detect fault current in coordination with the number of reclosing operations that are performed by the circuit breakers 74 and 94, where the first time they detect fault current they likely will remain closed. When the accumulated number of times that the switching devices 100, 102, 104 and 106 detect the fault current reaches a predetermined threshold, such as two, and then the switching devices 100, 102, 104 and 106 detect loss of voltage when the circuit breakers 74 and 94 open the next time they will all open.

When the circuit breakers 74 and 94 reclose the next time, they will not detect the fault current because the switching devices 100, 102, 104 and 106 are open, and will remain closed. When the switching devices 100 and 106 detect a return of voltage on their upstream side, they will pulse test and since the switching devices 102 and 104 are open they will not detect the fault presence and will close. When the switching devices 102 and 104 detect a return of voltage on their upstream side, they will pulse test closed and since the fault is in the section 110 they will detect the fault presence and will not close, and will then lock open. Thus, the fault is isolated in the section 110 and power is restored to the substations 114 and 116.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A power restoration system for an electrical power network, the power restoration system comprising:
    a power line;
    at least one power source providing power to the power line;
    at least one fault interrupting device electrically coupled to the power line, the at least one fault interrupting device being operable to detect fault current and perform reclosing operations;
    a plurality of switching devices electrically coupled along the power line downstream of the at least one fault interrupting device, the plurality of switching devices each having current and voltage sensing capability, have the capability to provide pulse testing for detecting fault presence using a low energy pulse and have the same or similar opening response time, wherein in response to a fault on the power line, the at least one fault interrupting device performs reclosing operations, and when the plurality of switching devices detect fault current a predetermined number of times in coordination with reclosing operations performed by the at least one fault interrupting device and detect loss of voltage when the at least one fault interrupting device opens again will open; and,
    the at least one fault interrupting device closes when the plurality of switching devices are opened as a result of detecting the predetermined number of fault current passages, and wherein the plurality of the switching devices sequentially pulse test and close from a furthest upstream switching device when detecting return of voltage and no fault presence until a switching device closest to the fault pulse tests and detects fault presence and locks open.

2. The power restoration system according to claim 1 wherein the plurality of switching devices are not in communication with each other using an external communications system.

3. The power restoration system according to claim 1 wherein the plurality of switching devices are not fault interrupting devices.

4. The power restoration system according to claim 1 wherein the at least one power source is a first power source providing power to one end of the power line and a second power source providing power to another end of the power line and the at least one fault interrupting device is a first fault interrupting device at the one end of the power line and a second fault interrupting device at the another end of the power line.

5. The power restoration system according to claim 1 wherein the electrical power network is a medium voltage power distribution network.

6. The power restoration system according to claim 1 wherein the electrical power network is a high voltage power transmission network.

7. The power restoration system according to claim 1 wherein the at least one power source is an electrical substation.

8. A power restoration system for an electrical power transmission network, the power restoration system comprising:
a transmission power line;
a first substation providing high voltage power to one end of the power line;
a second substation providing high voltage power to an opposite end of the transmission power line;
a first fault interrupting device electrically coupled to the one end of the transmission power line, the first fault interrupting device being operable to detect fault current and perform reclosing operations;
a second fault interrupting device electrically coupled to the opposite end of the power line, the second fault interrupting device being operable to detect fault current and perform reclosing operations;
a plurality of switching devices electrically coupled along the transmission power line between the first and second fault interrupting devices, the plurality of switching devices each having current and voltage sensing capability, have the capability to provide pulse testing for detecting fault presence and have the same or similar opening response time, wherein in response to a fault on the power line, the first and second fault interrupting devices perform reclosing operations, and wherein when the plurality of switching devices detect fault current a predetermined number of times in coordination with reclosing operations performed by the fault interrupting devices and detect loss of voltage when the fault interrupting devices open following a reclose operation will open; and,
the fault interrupting devices close when the plurality of switching devices open, and wherein the plurality of the switching devices sequentially pulse test and close from a furthest upstream switching device when detecting return of voltage and no fault presence is detected until a switching device closest to the fault pulse tests and detects fault presence and locks open.

9. The power restoration system according to claim 8 wherein the plurality of switching devices are not in communication with each other using an external communications system.

10. The power restoration system according to claim 8 wherein the plurality of switching devices are not fault interrupting devices.

11. A method for restoring power in an electrical power network comprising:
detecting fault current on a power line flowing from at least one power source to a fault by at least one fault interrupting device and a plurality of switching devices distributed along the power line, the switching devices each having current and voltage sensing capability, are capable of providing pulse tests for detecting fault presence and have the same or similar opening response time subject to the influences of load;
performing reclosing by the at least one fault interrupting device to determine if the fault is still present;
accumulating a number of times that the plurality of switching devices detect fault current in response to the reclosing operations performed by the at least one fault interrupting device;
opening all of the plurality of switching devices when the accumulated number of times reaches a predetermined number and detecting loss of voltage when the at least one fault interrupting device opens following a reclosing operation;
closing the at least one fault interrupting device when the plurality of switching devices open; and
sequentially pulse testing and closing the switching devices from a furthest upstream switching device when detecting return of voltage and no fault presence until a switching device closest to the fault pulse tests and detects fault presence and locks open.

12. The method according to claim 11, wherein the plurality of switching devices are not in communication with each other using an external communications system.

13. The method according to claim 11, wherein the plurality of switching devices are not fault interrupting devices.

14. The method according to claim 11, wherein detecting fault current on a power line includes detecting fault current on a power line flowing from a first power source at one end of the power line and a second power source at an opposite end of the power line, and wherein the at least one fault interrupting device is a first fault interrupting device at the one end of the power line and a second fault interrupting device at the another end of the power line.

15. The method according to claim 11, wherein the electrical power network is a medium voltage power distribution network.

16. The method according to claim 11, wherein the electrical power network is a high voltage power transmission network.

17. The method according to claim 11, wherein the at least one power source is an electrical substation.

\* \* \* \* \*